W. H. DOUGLAS.
DRIVING AND STEERING MECHANISM FOR MOTOR VEHICLES.
APPLICATION FILED JUNE 21, 1910.
1,011,591.
Patented Dec. 12, 1911.
2 SHEETS—SHEET 1.
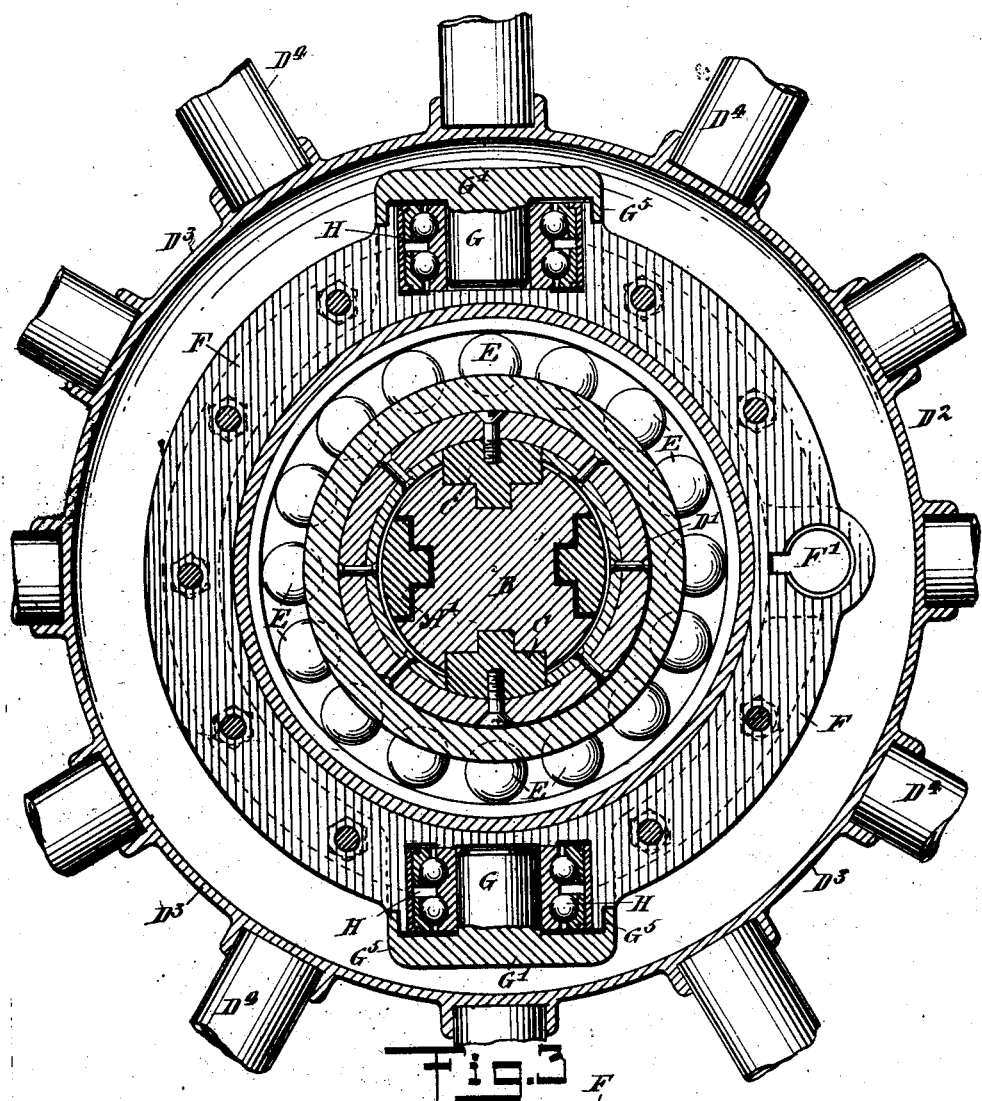
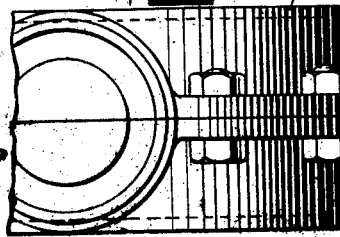
WITNESSES:
INVENTOR
William H. Douglas
BY
ATTORNEYS

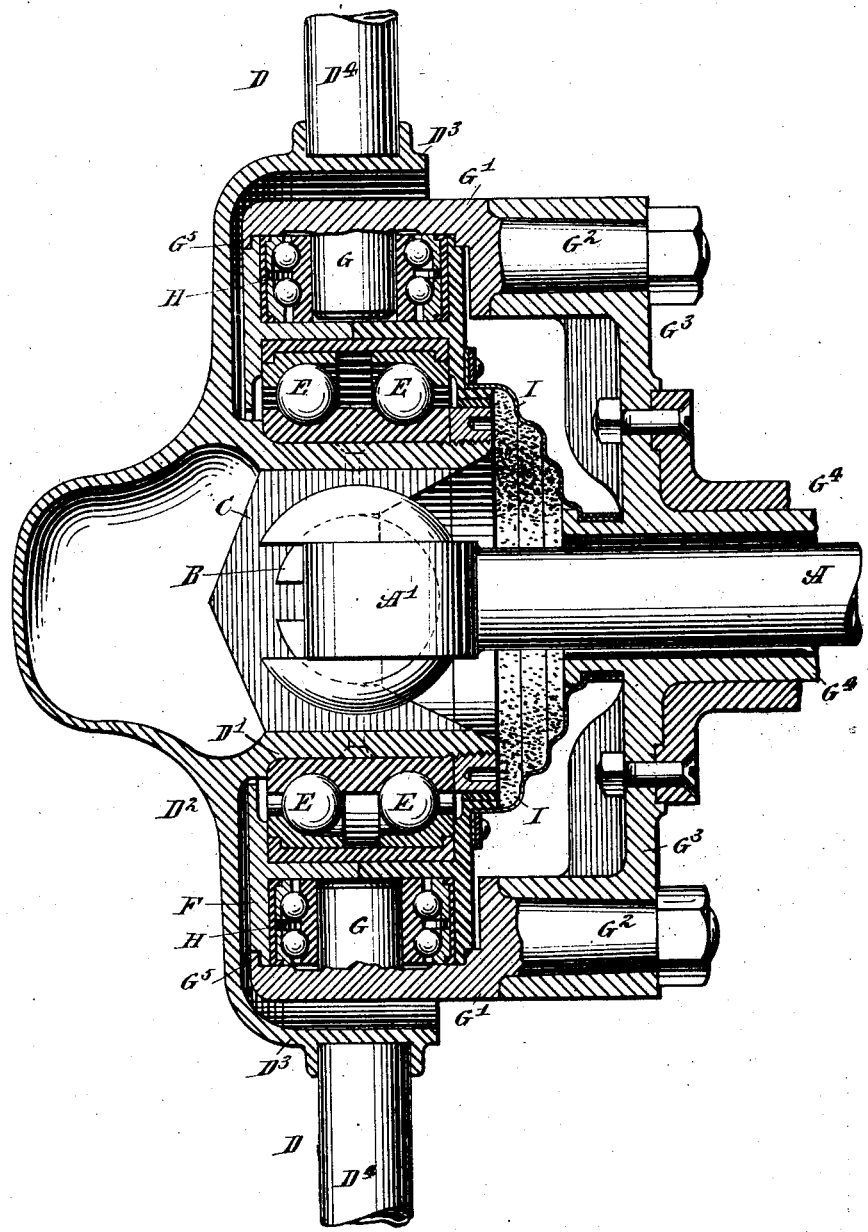

UNITED STATES PATENT OFFICE.

WILLIAM HENRY DOUGLAS, OF BELLEVILLE, NEW JERSEY, ASSIGNOR TO HEALEY & CO., OF NEW YORK, N. Y.

DRIVING AND STEERING MECHANISM FOR MOTOR-VEHICLES.

1,011,591. Specification of Letters Patent. Patented Dec. 12, 1911.

Application filed June 21, 1910. Serial No. 568,142.

*To all whom it may concern:*

Be it known that I, WILLIAM H. DOUGLAS, a citizen of the United States, and a resident of Belleville, in the county of Essex and State of New Jersey, have invented a new and Improved Driving and Steering Mechanism for Motor-Vehicles, of which the following is a full, clear, and exact description.

The object of the invention is to provide a new and improved driving mechanism for automobiles and other motor vehicles, arranged in the plane of the wheel, to reduce twisting strains to a minimum, to insure easy running of the wheel, and to render the driving connection between the driven axle and the wheel exceedingly simple and durable in construction.

For the purpose mentioned use is made of a driving axle, connected by a universal joint with the vehicle wheel, the center of the joint lying approximately in the plane of the wheel.

A practical embodiment of the invention is represented in the accompanying drawings forming a part of this specification, in which similar characters of reference indicate corresponding parts in all the views.

Figure 1 is a sectional side elevation of the driving and steering mechanism for motor vehicles; Fig. 2 is a transverse section of the same; and Fig. 3 is a plan view of part of the steering knuckle.

The driving axle A is made in the usual sections, connected at their inner ends by a differential gearing with the driven shaft of the motor, and the outer end of each section of the axle A is provided with a fork A′ engaging a ball B, which is also engaged by a fork C, secured to or formed on the inner side of a hub D′, forming an integral part of the center D² of the vehicle wheel D, the said center D² having a rim D³, carrying the spokes D⁴, as indicated in Figs. 1 and 2, the said hub D′, rim D³ and spokes D⁴ being arranged in a plane passing through the middle of the wheel, as will be readily understood by reference to Fig. 2. The ball B connecting the fork A′ of the axle A with the fork C of the wheel D, forms a universal joint, the center of which is located in the plane of the wheel above referred to. On the outer side of the hub D′ is arranged a ball bearing E, interposed between the said hub D′ and a swing knuckle F, provided at one side with an offset F′, connected in the usual manner with the steering gear of the vehicle, so as to permit the driver of the motor vehicle to turn the knuckle F whenever it is desired to steer the vehicle to one side or the other.

The knuckle F is engaged at the top and bottom by trunnions G, projecting inwardly toward each other from arms G′, having bolts G² engaging a head G³, forming part of a tubular supporting member G⁴, adapted to support the body of the vehicle in any approved manner. Between the trunnions G and the knuckle F are interposed ball bearings H, closed at the outer faces by caps G⁵, formed on the arms G′, so as to exclude all dust and other extraneous matter from the said ball bearings H.

By reference to Fig. 2, it will be noticed that the axes of the trunnions G are disposed in the plane of the wheel previously mentioned, that is, the said axes pass through the center of the ball B of the universal joint, and hence the several parts of the driving and steering mechanism are arranged in a central line of pressure, to reduce twisting strains to a minimum and to insure easy running of the wheel.

The steering knuckle F is approximately ring-shaped and made in sections bolted together as indicated in the drawings, and the inner face of the knuckle F is connected with one end of a flexible tube I, attached at its other end to the head G³ of the supporting member G⁴, to exclude all dust and other extraneous matter from the ball bearing E and the universal joint arranged within the hub D′ of the vehicle wheel D. The tube I is made of flexible material, to flex on turning the steering wheel from a straight path.

By reference to Fig. 2, it will be seen that the outer face of the center D² of the wheel is completely closed and consequently no dust or other extraneous matter can pass to the ball bearings E and H from the outer face of the wheel. By arranging the center D² of the wheel in the manner described, the driving and steering mechanism is practically contained within the said center, and the said driving mechanism is rendered exceedingly simple and durable in construction, and access can be readily had to the parts for repairs and other purposes. The ball B is provided with annular grooves, standing at right angles one to the other, one of the grooves being engaged by the fork A' and the other by the fork C, so as to provide a simple universal joint requiring no pivots, bolts or other device for fastening the parts together.

Having thus described my invention, I claim as new and desire to secure by Letters Patent:

1. A motor vehicle provided with a driving and steering wheel having a hub and a rim, a driving axle, a universal joint connecting the driving axle with the hub, a steering knuckle intermediate the hub and rim, the said steering knuckle being approximately ring shaped and formed in sections, means for securing the sections of the knuckle together, the said sections each having an annular inwardly extending flange, approximately at the center thereof, ball bearings interposed between the said flanges of the sections of the knuckle and the outer side of the hub, and a supporting member having arms provided with trunnions engaging said knuckle at the top and bottom thereof.

2. A motor vehicle provided with a driving and steering wheel having a center closed at the outer face and having an integral hub and an integral rim, an axle, a universal joint connecting the said axle with the said hub at the inside thereof, a steering knuckle intermediate the said hub and rim, a bearing interposed between the said knuckle and the exterior of the said hub, a supporting member having a tube through which extends the said axle, a head at the end of the tube, and arms having bolts connected with the said head, the said arms being provided with pivots engaging the said knuckle, and ball bearings interposed between the said pivots and the said knuckle.

3. A motor vehicle provided with a driving and steering wheel having a center closed at the outer face and having an integral hub and an integral rim, an axle, a universal joint connecting the said axle with the said hub at the inside thereof, a steering knuckle intermediate the said hub and rim, a bearing interposed between the said knuckle and the exterior of the said hub, a supporting member having a tube through which extends the said axle, a head at the end of the tube, arms having bolts engaging the said head, the said arms being provided with pivots engaging the said knuckle, ball bearings interposed between the said pivots and the said knuckle, and caps on the said arms covering the said ball bearings for the trunnions.

4. A motor vehicle provided with a driving wheel having a hub, a driving axle, a universal joint connecting the said driving axle with the hub at the inside thereof, a steering knuckle surrounding the said hub, a bearing intermediate the said knuckle and the exterior of the wheel hub, a fixed supporting member having a tube through which extends the said axle, the said supporting member having a head adjacent to one end of the tube, and arms having bolts at one end connected with said head, the said arms being provided with pivots engaging the said knuckle, and a flexible tube connected at one end with the inner face of the knuckle and attached at its other end to the end of the tube of said supporting member.

In testimony whereof I have signed my name to this specification in the presence of two subscribing witnesses.

WILLIAM HENRY DOUGLAS.

Witnesses:
  THEO. G. HOSTER,
  JOHN P. DAVIS.